(12) United States Patent
Chang et al.

(10) Patent No.: US 12,386,125 B2
(45) Date of Patent: Aug. 12, 2025

(54) OPTICAL FIBER CONNECTOR WITH CHANGEABLE GENDER

(71) Applicant: Senko Advanced Components, Inc., Hudson, MA (US)

(72) Inventors: Jimmy Jun Fu Chang, Sturbridge, MA (US); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 18/431,896

(22) Filed: Feb. 2, 2024

(65) Prior Publication Data

US 2024/0176080 A1 May 30, 2024

Related U.S. Application Data

(63) Continuation of application No. 18/170,498, filed on Feb. 16, 2023, now Pat. No. 11,892,688, which is a continuation of application No. 17/195,137, filed on Mar. 8, 2021, now Pat. No. 11,585,988, which is a continuation of application No. 16/784,993, filed on Feb. 7, 2020, now abandoned, which is a continuation of application No. 16/453,115, filed on Jun. 26, 2019, now Pat. No. 11,073,662, which is a continuation of application No. 15/958,227, filed on Apr. 20, 2018, now Pat. No. 10,409,009, which is a continuation of application No. 15/626,430, filed on Jun. 19, 2017, (Continued)

(51) Int. Cl.
   *G02B 6/38* (2006.01)

(52) U.S. Cl.
   CPC ......... *G02B 6/3882* (2013.01); *G02B 6/3825* (2013.01); *G02B 6/3826* (2013.01); *G02B 6/3885* (2013.01)

(58) Field of Classification Search
   CPC .. G02B 6/3882; G02B 6/3825; G02B 6/3826; G02B 6/3885
   See application file for complete search history.

(56) References Cited

U.S. PATENT DOCUMENTS

| | | |
|---|---|---|
| 2,163,201 A | 6/1939 | Kalencik |
| 2,538,296 A | 1/1951 | Crocker |
| (Continued) | | |

FOREIGN PATENT DOCUMENTS

| | | |
|---|---|---|
| CA | 2495693 A1 | 4/2004 |
| CN | 2836038 Y | 11/2006 |
| (Continued) | | |

OTHER PUBLICATIONS

Non-Final Office Action received for U.S. Appl. No. 16/453,115 dated Jul. 24, 2020, 27 pages.
(Continued)

*Primary Examiner* — John Bedtelyon

(57) ABSTRACT

A multi-fiber, fiber optic connector is interchangeable between a male connector and a female connector by including a pin retainer having a releasable retention device configured to lock the pins in place within the retainer. The retention device may be opened, for example, with a release tool, to free the retention pins for removal of the pins. A method for switching a connector between a male connector configuration and a female connector configuration may be possible as a result of the releasable retention configuration.

27 Claims, 12 Drawing Sheets

Related U.S. Application Data now Pat. No. 9,977,199, which is a continuation of application No. 14/725,514, filed on May 29, 2015, now Pat. No. 9,684,139.

(56) References Cited

U.S. PATENT DOCUMENTS

| | | |
|---|---|---|
| 2,624,776 A | 6/1953 | Price |
| 3,025,486 A | 3/1962 | Falconer |
| 3,721,945 A | 3/1973 | Hults |
| 3,733,576 A | 5/1973 | Cooper |
| 4,296,999 A | 10/1981 | Mead |
| 4,327,964 A | 8/1982 | Haesley et al. |
| 4,356,360 A | 10/1982 | Volz |
| 4,478,473 A | 10/1984 | Frear |
| 4,626,052 A | 12/1986 | Rumble |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,210,934 A | 5/1993 | Lenzi et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 5/1994 | Newman et al. |
| 5,348,487 A | 9/1994 | Marazzi et al. |
| 5,444,806 A | 8/1995 | DeMarchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,791,921 A | 8/1998 | Lee |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,085,003 A | 7/2000 | Knight |
| 6,134,370 A | 10/2000 | Childers et al. |
| 6,178,283 B1 | 1/2001 | Weigel |
| RE37,080 E | 3/2001 | Stephenson et al. |
| 6,200,040 B1 | 3/2001 | Edwards et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,419,504 B1 | 7/2002 | Nelson |
| 6,461,054 B1 | 10/2002 | Iwase |
| 6,464,408 B1 | 10/2002 | Nolan |
| 6,471,412 B1 | 10/2002 | Belenkiy et al. |
| 6,478,472 B1 | 11/2002 | Anderson et al. |
| 6,530,696 B1 | 3/2003 | Ueda |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,669,377 B2 | 12/2003 | Barnes et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,923,666 B1 | 8/2005 | Liao |
| 6,935,789 B2 | 8/2005 | Gross, III et al. |
| 7,036,993 B2 | 5/2006 | Luther |
| 7,091,421 B2 | 5/2006 | Kukita et al. |
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,121,850 B2 | 10/2006 | Yeh |
| D533,504 S | 12/2006 | Lee |
| D534,124 S | 12/2006 | Taguchi |
| 7,077,576 B2 | 12/2006 | Luther et al. |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,264,402 B2 | 9/2007 | Theuerkom |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Bing et al. |
| 7,513,695 B1 | 4/2009 | Lin et al. |
| 7,540,666 B2 | 6/2009 | Luther |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,670,177 B2 | 3/2010 | Myer et al. |
| 7,695,199 B2 | 4/2010 | Teo et al. |
| 7,695,316 B2 | 4/2010 | Sun |
| 7,699,533 B2 | 4/2010 | Milette |
| 7,785,019 B2 | 8/2010 | Lewallen |
| 7,824,113 B2 | 11/2010 | Wong et al. |
| 7,837,395 B2 | 11/2010 | Lin et al. |
| D641,708 S | 7/2011 | Yamauchi |
| 8,157,578 B2 | 4/2012 | Lee |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,277,237 B1 | 10/2012 | Cherish |
| 8,408,815 B2 | 4/2013 | Lin et al. |
| 8,465,317 B2 | 6/2013 | Gniadek et al. |
| 8,534,928 B2 | 9/2013 | Cooke |
| 8,622,634 B2 | 1/2014 | Arnold |
| 8,651,749 B2 | 2/2014 | Junior et al. |
| 8,678,670 B2 | 3/2014 | Takahashi |
| 8,757,893 B1 | 6/2014 | Isenhour et al. |
| 8,768,125 B2 | 7/2014 | Beatty et al. |
| 9,046,660 B2 | 6/2015 | Good et al. |
| 9,411,101 B2 | 8/2016 | Takahashi et al. |
| 9,684,139 B2 | 6/2017 | Chang et al. |
| 9,778,425 B2 | 10/2017 | Nguyen et al. |
| 9,798,094 B2 | 10/2017 | Kuffel |
| 9,829,645 B2 | 11/2017 | Good |
| 9,977,199 B2 | 5/2018 | Jimmy et al. |
| 10,725,249 B2 | 7/2020 | Higley et al. |
| 2002/0110333 A1 | 8/2002 | Yang |
| 2002/0191919 A1 | 12/2002 | Nolan |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0152354 A1 | 8/2004 | Luther et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |

(56) References Cited

U.S. PATENT DOCUMENTS

| | | |
|---|---|---|
| 2006/0067628 A1 | 3/2006 | Suzuki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0025665 A1 | 2/2007 | Dean et al. |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | de Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0170797 A1 | 7/2013 | Ott |
| 2013/0183012 A1 | 7/2013 | Cabanne Lopez et al. |
| 2013/0216185 A1* | 8/2013 | Klavuhn ............ G02B 6/3882 385/60 |
| 2013/0259429 A1 | 10/2013 | Czosnowski et al. |
| 2013/0315539 A1 | 11/2013 | Koreeda et al. |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0023326 A1 | 1/2014 | Anderson et al. |
| 2014/0050446 A1 | 2/2014 | Chang |
| 2014/0133808 A1 | 5/2014 | Hill et al. |
| 2014/0154913 A1 | 6/2014 | Ho |
| 2014/0226946 A1 | 8/2014 | Cooke et al. |
| 2014/0334780 A1 | 11/2014 | Nguyen et al. |
| 2014/0348477 A1 | 11/2014 | Chang |
| 2015/0003785 A1 | 1/2015 | Raven et al. |
| 2015/0378113 A1 | 12/2015 | Good et al. |
| 2018/0364421 A1 | 12/2018 | Chang et al. |
| 2019/0384017 A1 | 12/2019 | Lu |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | S63229416 A | 9/1988 |
| JP | 3363479 A | 2/1994 |
| JP | 2003014983 A | 1/2003 |
| JP | 2009229545 A | 10/2009 |
| JP | 2009276493 A | 11/2009 |
| KR | 20110009902 A | 1/2011 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2013038204 A1 | 3/2013 |
| WO | 2014/028527 A1 | 2/2014 |
| WO | 2014/182351 A1 | 11/2014 |
| WO | 2015/191024 A1 | 12/2015 |
| WO | 2016053851 A1 | 4/2016 |
| WO | 2016/148741 A1 | 9/2016 |

OTHER PUBLICATIONS

Notice of Allowance received for U.S. Appl. No. 16/453,115 dated Oct. 3, 2019, 26 pages.
European Search Report and Written Opinion dated Mar. 3, 2015 for EP 14187661.
European Search Report and Written Opinion dated Feb. 19, 2015 for EP 14168005.
"Fiber Optic Connectors and Assemblies Catalog" 2009, Huber & Suhner Fiber Optics, Herisau, Switzerland, www. nubersuhner.com.
"Fiber Optic Interconnect Solutions, Tactical Fiber Optical Connectors, Cables and Termini" 2006, Glenair, Inc., Glendale, California, www.mps-electronics.de.
Fiber Optic Products Catalog Nov. 2007, Tyco Electronics Corporation, Harrisburg, Pennsylvania, www. ampnetconnect.com.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Oct. 9, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Aug. 22, 2016 from related International Application No. PCTUS2015/059458, International Filing Date Nov. 6, 2015.
International Search Report {ISR) W02008112986 Sep. 15, 2009.
ISR W020140285271SR Feb. 20, 2014.
ISR W02015US57610ISR Jan. 21, 2016.
Ex Parte ReExamination, Application No. 90/020, 125, dated Apr. 15, 2019, p. 31.
International Search Report and Written Opinion dated Mar. 30, 2016 from corresponding International Application No. PCT /US15/65479, International Filing Date Dec. 14, 2015.
International Preliminary Report on Patentability dated Dec. 14, 2017, from related International Application No. PCT/US15/65479, International Filing Date Dec. 14, 2015.
Non-Final Office Action from related U.S. Appl. No. 14/725,514, filed May 29, 2015, dated Jun. 30, 2016, 10 pages.
Non-Final Office Action from related U.S. Appl. No. 15/626,430 dated Jul. 28, 2017, 10 pages.
International Search Report, Application No. 15/894,501.4, pp. 8, dated Dec. 3, 2018.
Jones, et al., U.S. Appl. No. 62/058, 188, filed Oct. 1, 2014, entitled: Fiber Optic Connector and Pin Change Method for the Same.
Chang et al., Request for Ex Parte Reexamination of U.S. Pat. No. 9,977,199, dated Dec. 7, 2018, entitled: Optical Fiber Connector With Changeable Gender.
Non-Final Office Action received for U.S. Appl. No. 16/784,993 dated Oct. 6, 2020, 12 pages.

(56) References Cited

OTHER PUBLICATIONS

Non-Final Office Action received for U.S. Appl. No. 15/958,227 dated Oct. 1, 2018, 14 pages.

* cited by examiner

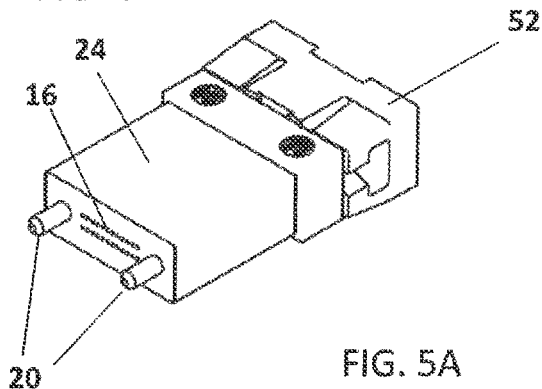
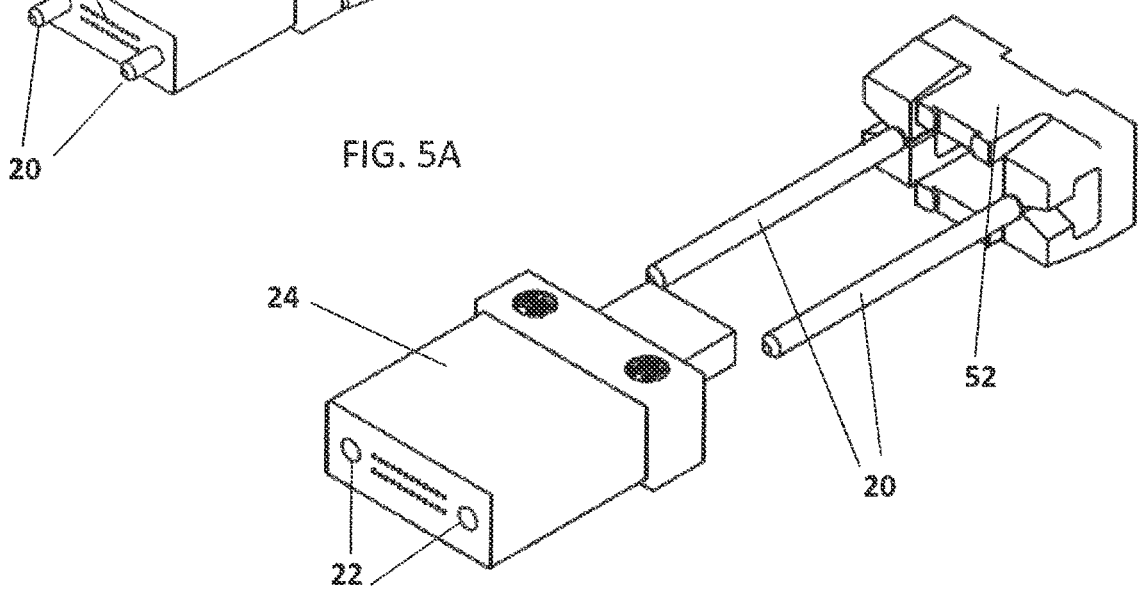
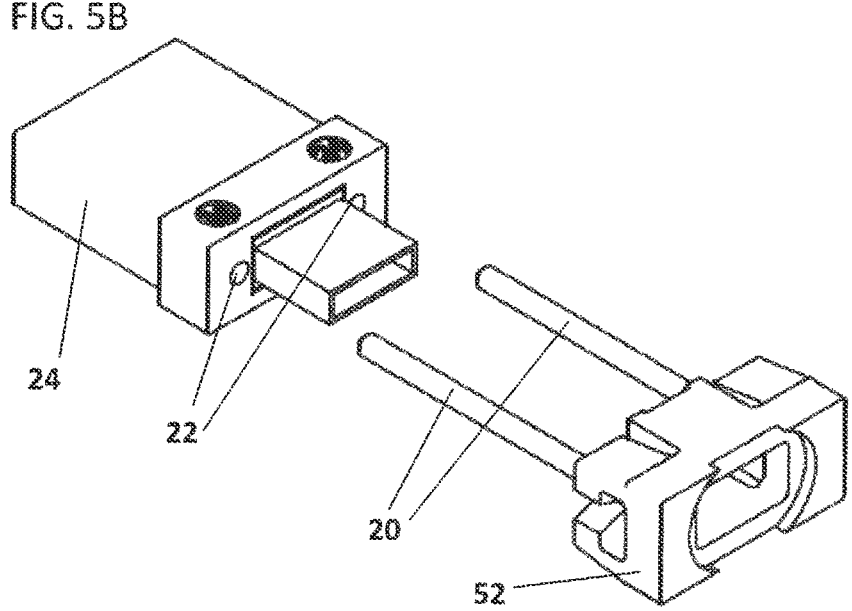

SECTION C-C

SECTION D-D

DETAIL XI

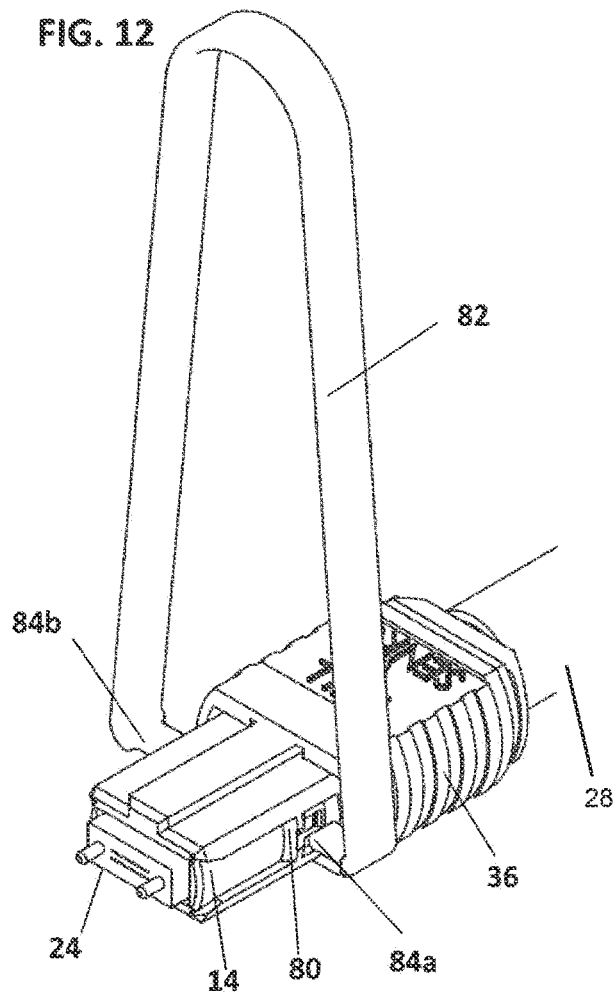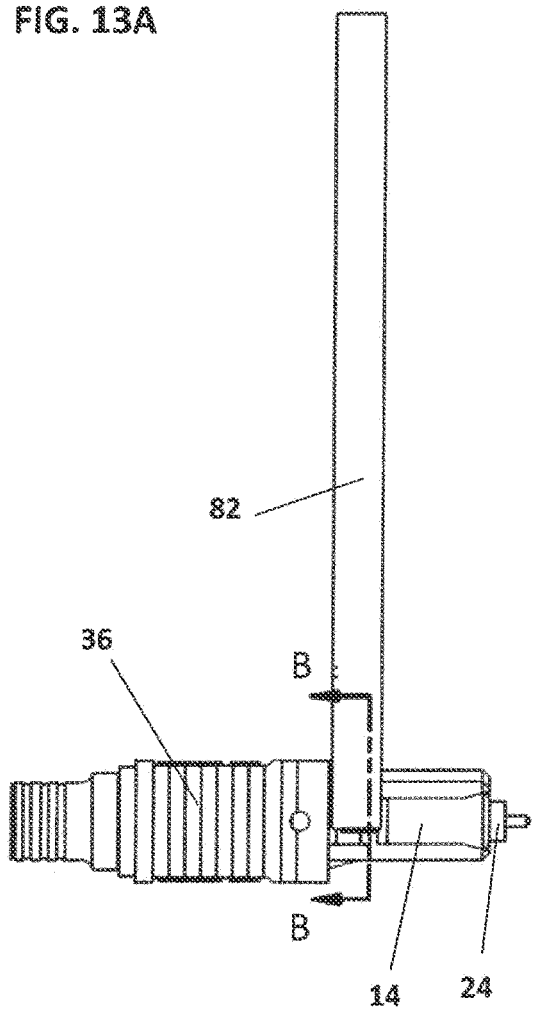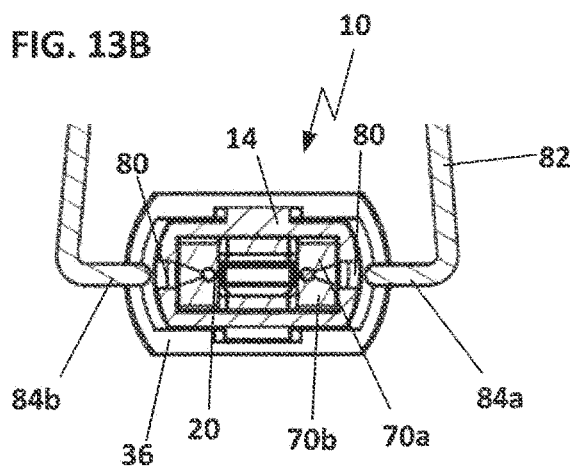

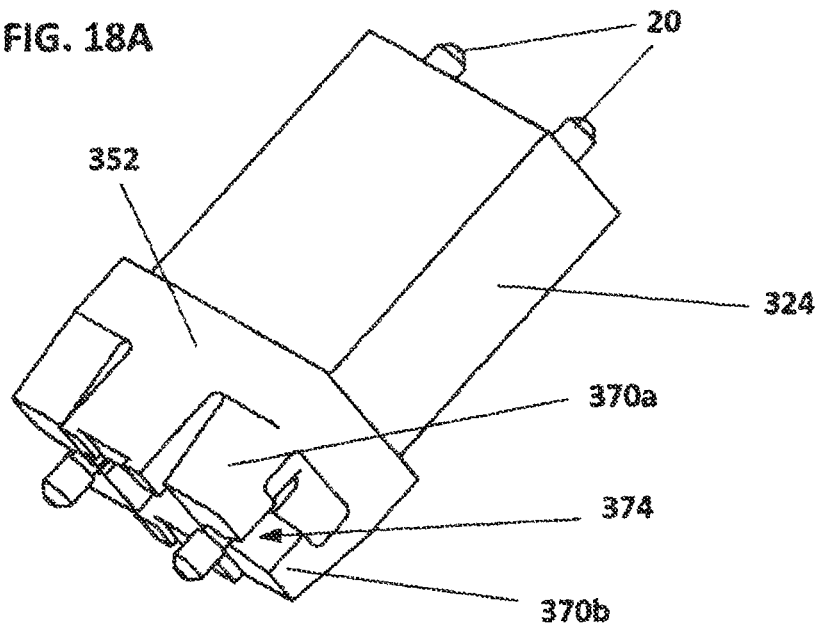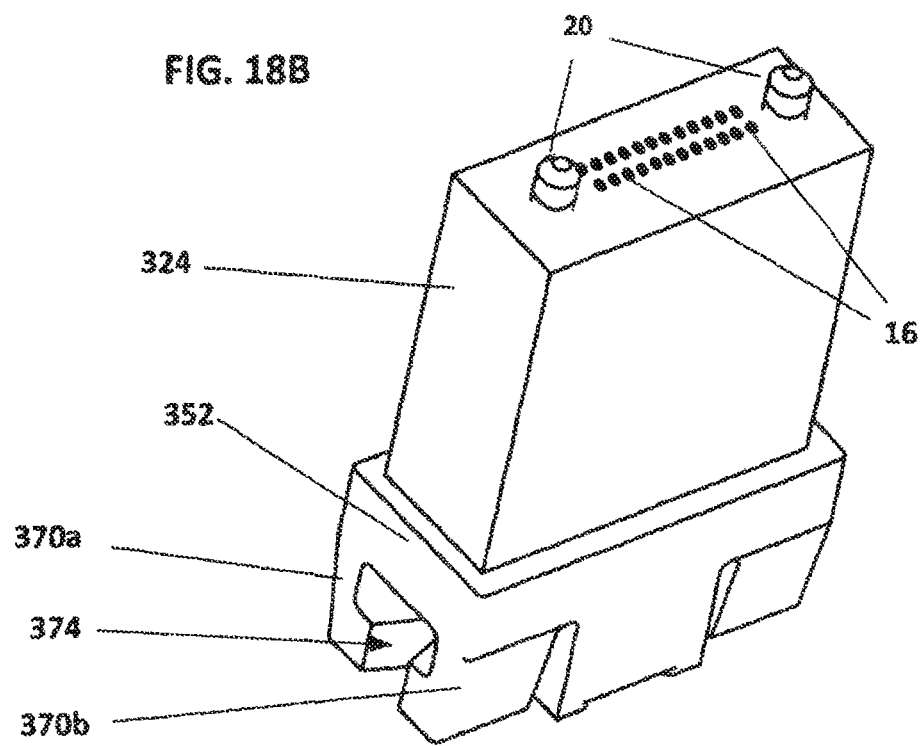

OPTICAL FIBER CONNECTOR WITH CHANGEABLE GENDER

CROSS-REFERENCE TO RELATED APPLICATION

This application a continuation of U.S. patent application Ser. No. 18/170,498 filed on Feb. 16, 2023, which is a continuation of U.S. patent application Ser. No. 17/195,137 filed on Mar. 8, 2021 and now U.S. Pat. No. 11,585,988 granted on 02/21/2023, which is a continuation of U.S. patent application Ser. No. 16/784,993 filed on Feb. 7, 2020, a continuation of U.S. patent application Ser. No. 16/453,115 filed on Jun. 26, 2019 and now U.S. Pat. No. 11,073,662 granted on 07/27/2021, a continuation of U.S. patent application Ser. No. 15/958,227, filed Apr. 20, 2018 and now U.S. Pat. No. 10,409,009 granted on Sep. 10, 2019, which is a continuation of U.S. patent application Ser. No. 15/626,430 filed on Jun. 19, 2017 and is now U.S. Pat. No. 9,977,199 issued on May 22, 2018, which is continuation of U.S. patent application Ser. No. 14/725,514, filed May 29, 2015, now U.S. Pat. No. 9,684,139 issued on Jun. 20, 2017, all of which are incorporated herein by reference in its entirety.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MT (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

MT (Mechanically Transferable) ferrules are optical ferrules which are standardized according to JIS C 5981, IEC 61754-5 and the like. The MT ferrules get pushed together within the adapter to optically connect the ferrules by means of a so-called PC (Physical Contact) connection, wherein the optical fibers in one ferrule contact the optical fibers in the other ferrule and get compressed together to provide an optical connection. Optical transmission performance between the optical fibers is strongly dependent on connecting conditions such as axis alignment and inclination of the optical fibers, and gaps between the opposing optical fibers.

MT ferrules generally use at least two guide pins for high-accuracy alignment of the optical fibers in the mating ferrules. An MT ferrule body may include at least two guide pin holes on the end surface of the ferrule for receiving the guide pins therein. For a pair of mating connectors, one of the ferrule bodies of a first connector may be provided with guide pins in the guide pin holes (generally called the 'male' connector), and the other ferrule body of a second connector may have only the guide pin holes (generally called the 'female' connector). As such, a highly accurate mating of the connectors may be achieved when the guide pins of the male connector are disposed within the guide pin holes of the female connector.

The gender, male or female, designation of a connector may often be typically predisposed during manufacturing of the connector, wherein connectors may be manufactured to be either male or female. Such connectors may be pre-installed on cable ends, and care must be taken so that the cables are all installed in the proper direction so that mating of male and female ends may possible. Alternatively, for on-site installation, a connector may be assembled onto a cable end, and during assembly the installer may install pins or a pin component into a ferrule body to provide a male connector, or alternatively, leave such pieces absent to provide a female connector.

For installations wherein the gender may accidentally end up being incorrect, or installations where the gender may need to be changed for one reason or another, such as a renovation or installation of a gender specific component, the gender of typical connectors is not changeable, or only changeable after disassembly and reassembly in the opposite designation. As such, for predetermined gender connectors, an entire connector may need to be removed and essentially scrapped, for replacement by an opposite gender connector, or for connectors requiring disassembly and reassembly, much time may be wasted in the re-gendering process.

Therefore, there remains a need for multi-fiber, fiber optic connectors that have the flexibility of easily changing the gender of the connector on site.

SUMMARY

A multi-fiber, fiber optic connector may include removable guide pins for changing the gender of the connector. The connector may be configured to releasably retain the guide pins therein. The guide pins may be insertable into the connector to convert the connector from a female connector to a male connector. Once inserted, the guide pins may be retained, or locked in place with a retention configuration. To convert from male to female, the retention configuration may be opened to release the guide pins, and the guide pins may be removed from the connector.

In an embodiment, a multi-fiber fiber optic connector interconvertible between a male connector and a female connector, includes a ferrule comprising a plurality of optical fibers supported therein and terminating at a first end of the ferrule for alignment with optical fibers of an additional device, at least two spaced apart passages disposed along at least a portion of the ferrule and configured for receiving alignment pins therein, a pin retainer configured for releasably retaining the alignment pins in a the connector when the alignment pins are disposed in the passages, and a housing disposed around the pin retainer and at least a portion of the ferrule. The pin retainer includes a portion for engaging each alignment pin to retain the alignment pins in the connector for a male configuration, wherein the portion for engaging is selectively releasable from the alignment pins for removal of the alignment pins for a female configuration.

In an embodiment a pin retainer for a fiber optic connector includes a body portion for being disposed with a ferrule in the connector, an at least one selectively displaceable locking member configured for locking an alignment pin with the body portion, wherein the selectively displaceable locking member has a first position for engaging an alignment pin to lock an alignment pin with the body portion, and a second position displaced from the first position for release of an alignment pin locked with the body portion.

In an embodiment a method for interconversion of a fiber optic connector between a male configuration with at least one alignment pin, and a female configuration with at least one passage for receiving an alignment pin is provided. The connector includes at least one selectively displaceable locking member for locking at least one alignment pin therein, and the method includes, for converting a female configuration to a male configuration, slidably inserting at least one alignment pin into engagement with the selectively displaceable locking member to lock the alignment pin into the connector, and for converting a male configuration to a female configuration, releasing the selectively displaceable locking member from the alignment pin, and slidably removing the alignment pin from the connector.

BRIEF DESCRIPTION OF THE FIGURES

FIG. 4 is a perspective view of a ferrule and a pin retainer according to an embodiment.

FIGS. 5A and 5B are front and rear exploded perspective views of the ferrule and the pin retainer of FIG. 4.

FIG. 12 shows a tool and placement thereof relative to the release slots according to an embodiment.

FIGS. 13A-13B are side and sectional views of the embodiment of FIG. 12 according to an embodiment.

FIGS. 18A-18B show a one-piece housing and pin retainer according to an embodiment.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

Figure 1A:
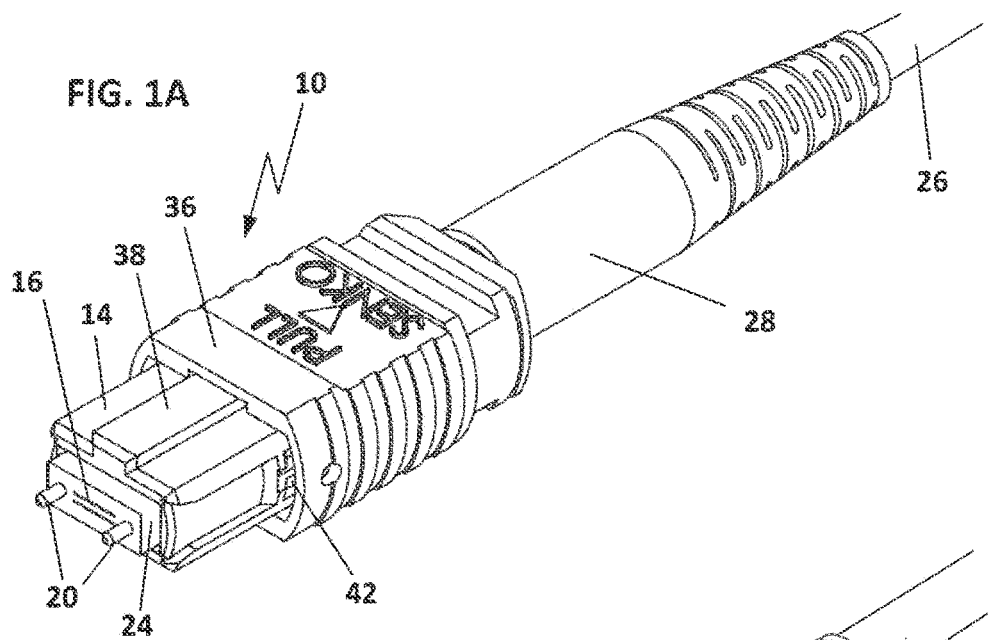
FIGS. 1A and 1B depict male and female configurations of an MPO connector according to an embodiment.
Figure 1B:
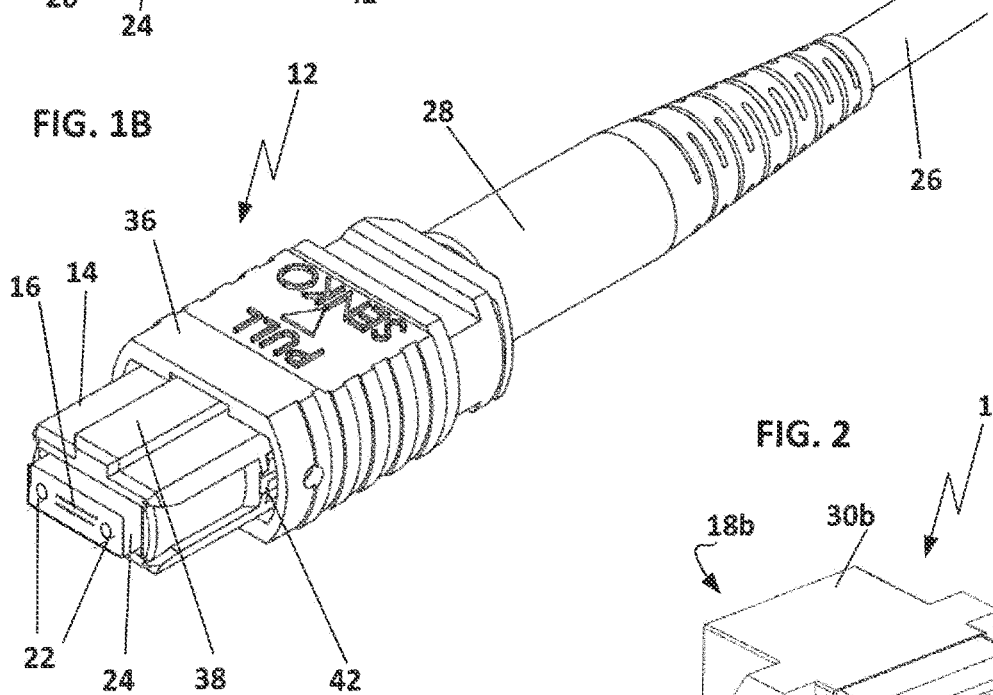
Figure 2:
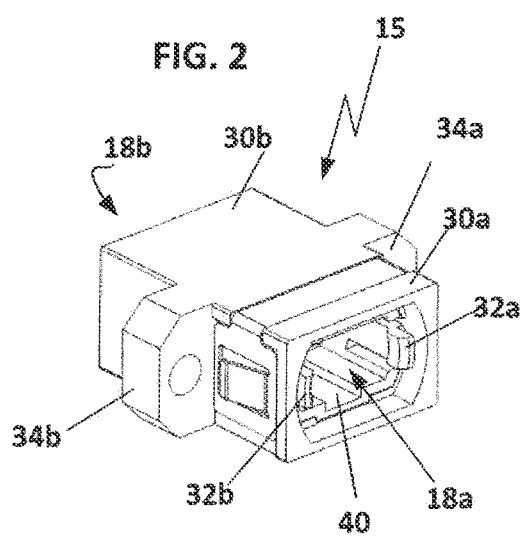
FIG. 2 depicts an MPO adapter as generally used for mating MPO connectors of FIGS. 1A and 1B.
Figure 3:
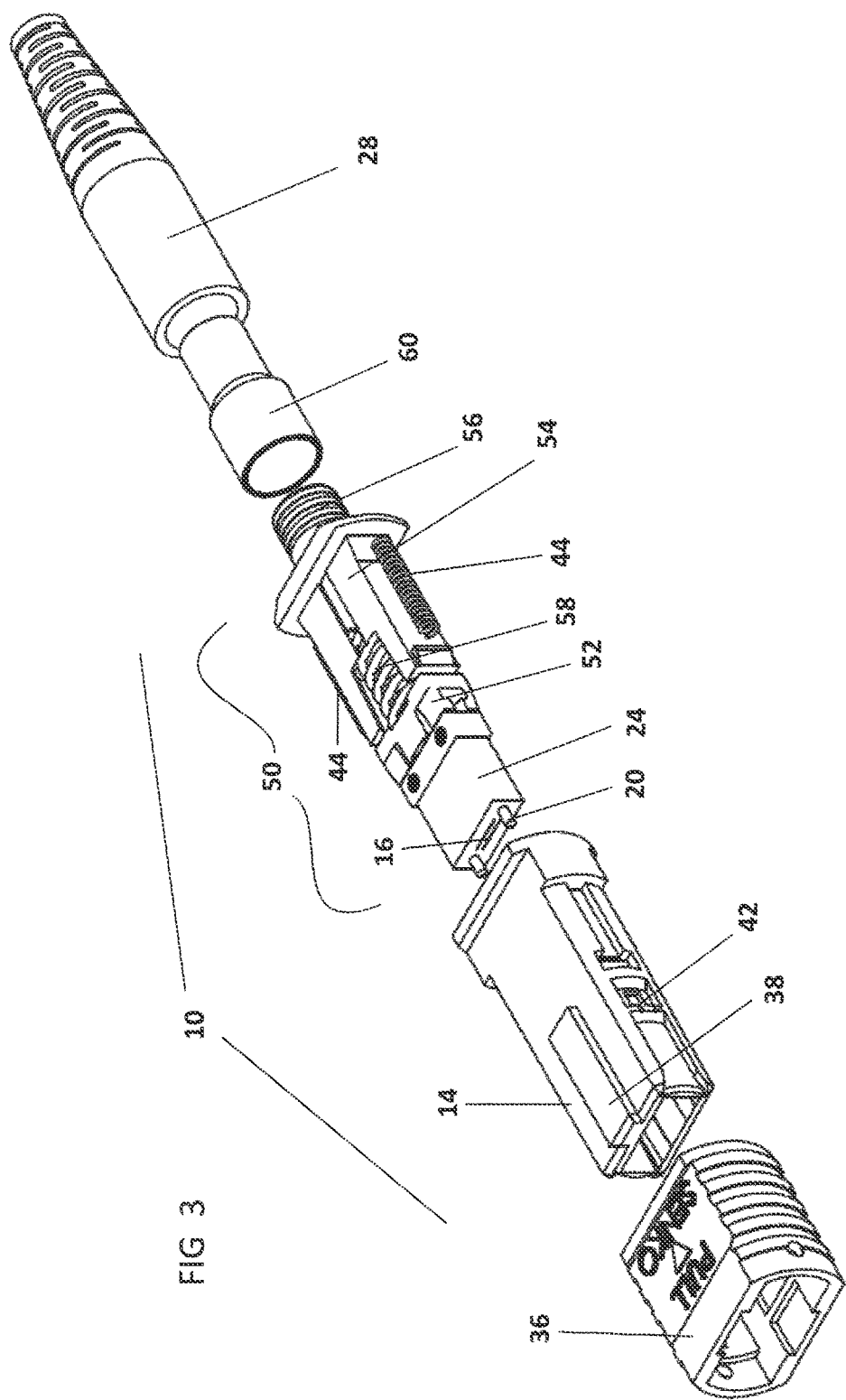
FIG. 3 is an exploded view of a male connector according to an embodiment.

For connection of cables together or with other fiber optic devices, the terminal ends of a cable may include a male connector 10 or female connector 12 as represented in FIGS. 1A and 1B, respectively, or in exploded view of FIG. 3. A connector 10, 12 may include an inner housing structure 14 configured to interact with and connect with an adapter 15 as represented in FIG. 2. An adapter 15, in a simple form, may include two aligned ports 18a, 18b for aligning fiber optic connectors 10, 12 therein to align and connect optical fibers 16 end-to-end. For proper alignment, the connectors to be aligned generally include one male connector 10 and one female connector 12. The male connector 10 generally includes at least two guide/alignment pins 20 that fit into the guide/alignment holes 22 of the female connector 12, thereby essentially ensuring proper alignment of the optical fibers 16 of the two connectors when mated end to end. As described herein, the connectors 10, 12 and adapters 15 may be considered multi-fiber connectors and multi-fiber adapters.

While the following description is directed towards MPO adapters and MPO connectors with MT optical ferrules, the embodiments described may be applicable to other adapters, connectors and ferrule types as well. An embodiment of an MPO connector 10, 12 may include a ferrule 24 that may be a multi-fiber ferrule as shown at a first end of the connector. In addition, the connector 10 may have attached thereto, a fiber optic cable 26 and cable boot 28 that may extend from a second end of the connector.

An adapter 15 may include a first end 30a having a first port 18a for receiving the ferrule end of an optical fiber connector 10, 12 therein, and may include a second end 30b having an additional port 18b (not visible) for receiving an additional optical fiber connector, or other type of fiber optic device therein.

For retention of an MPO connector 10 within each of the ports 18a, 18b, the ports may be provided internally with a connector clip that may be formed by the two resilient tabs 32a, 32b. The tabs 32a, 32b may be configured to be displaceable outwardly for insertion and removal of a connector 10, 12 into or out of the ports 18a, 18b, and may return to essentially their original position to engage and retain a connector in the ports. Adapters 15 may be configured to be mounted on a chassis panel, and may include mounting flanges 34a, 34b to mount the adapter via screws, for example.

A connector 10, 12 may include an inner housing 14 that may surround the ferrule 24. A connector 10, 12 may also include a displaceable outer housing member 36 that may be slidably disposed about the inner housing 14 adjacent the second end of the connector 10, 12. To provide for a pre-determined alignment of the fiber optic cables within the adapter 15, the inner housing 14 may include an alignment key 38 that is configured to fit within keying slot 40 of the adapter. Inner housing 14 may slide into port 18a (for example) until tabs 32a, 32b engage into slots 42 of the inner housing 14. The outer housing 36 may be moved towards the second end to allow the tabs 32a, 32b to engage into slots 42, and to retain the tabs in the slots, the outer housing 36 may be slid back towards the first end and over the tabs within the port 18a. The outer housing 36 may be biased towards the first end via springs 44, as shown for example in FIG. 3, or alternative types of biasing devices.

A male connector 10 is depicted in exploded view in FIG. 3. In an embodiment as shown, the ferrule 24, as part of a terminal cable assembly 50, may fit within the inner housing 14. The assembly 50 may also include a guide pin retainer 52 (described in more detail below), a terminal housing 54 to which the cable 26 attaches via the terminal post 56. A biasing member, such as a spring 58 may be disposed between the terminal housing 54 and the pin retainer 52 to bias the ferrule 24 forwardly within the inner housing 14. Such biasing provides a biased mating of ferrule ends and optical fibers 16 when connectors 10, 12 are mated in an adapter 15 to thereby hold the mated ferrule ends and optical fibers in contact with one another.

A fiber optic cable 26 as shown in FIGS. 1A, 1B may be retained with the terminal post 56 by means of a crimp sleeve 60, or other type of detainment connector. A connector such as sleeve 60 may be crimped to the terminal post 56 as well as to a cable sheathing of the cable 26 to thereby prevent the cable from being pulled away from the terminal housing 54.

A more detailed view of the ferrule 24 and pin retainer 52 are represented in FIGS. 4, 5A and 5B. As represented, the ferrule 24 may include at least two pin receiving holes or passages 22 that extend through the body of the ferrule. Guide pins 20 may be attached with the pin retainer 52, and may be slidably inserted into the holes 22 from the rear end of the ferrule 24 to provide a male ferrule assembly as represented in FIG. 4, for a male connector 10 as represented in FIG. 1A. For a female connector 12, as represented in FIG. 1B, the pin retainer 52 may be used alone, without the attached guide pins 20, thereby leaving the holes 22 open for mating with guide pins of a male connector 10.

In an embodiment as represented in FIG. 6 and FIGS. 7A-7D, the pin retainer 52 may be configured so that the guide pins 20 may be insertable into, and removable from the pin retainer. For each guide pin 20, the pin retainer may include a pin retention configuration, which may include a clip formed from a pair of opposed arms 70a, 70b. The arms 70a, 70b may define a retention space 72 therebetween into which a guide pin 20 may be disposed. The retention space may be cylindrical and may have a diameter ($d_1$) that corresponds with a reduced diameter notch 20b formed in the guide pin 20. The notch 20b may have a diameter ($d_2$) that is less than the diameter ($d_3$) of the guide pin 20 at least adjacent each side of the notch.

The arms 70a, 70b may be configured to have a degree of resilience sufficient to allow the arms to move away from one another by an amount sufficient to allow a guide pin 20 to be inserted between the arms, and once the guide pin is inserted, have the arms return to their original position to retain the guide pin in place.

Figure 6:
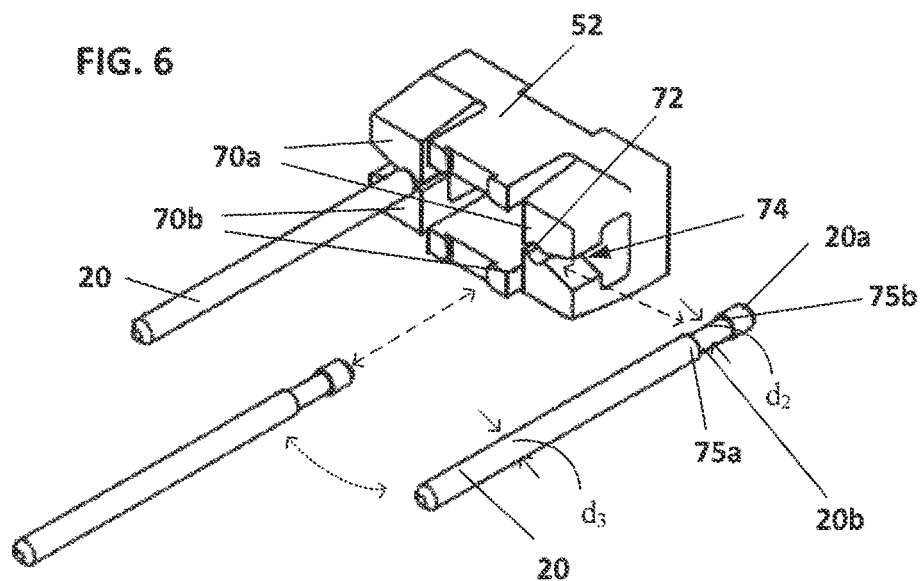
FIG. 6 is a perspective view of a pin retainer and guide pins according to an embodiment.
Figure 7A:
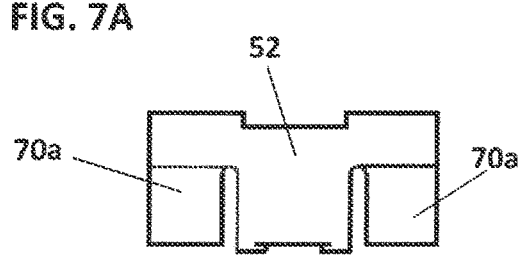
FIGS. 7A-7D are top, side, front and rear face views of a pin retainer according to an embodiment.
Figure 7B:
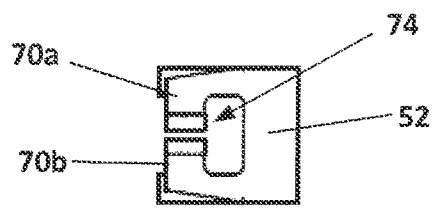
Figure 7C:
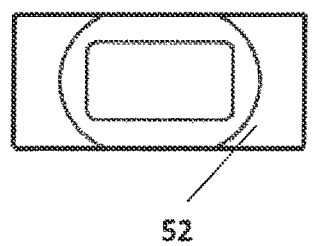
Figure 7D:
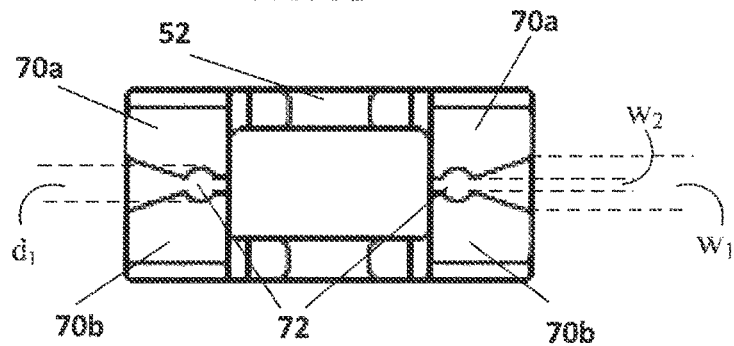

As represented by the dashed line in FIG. 6, a guide pin 20 may be laterally inserted into the retention space 72. The arms 70a, 70b may define a tapered groove 74 that has a first width ($w_1$) at the exterior lateral side of the pin retainer 52, and tapers to a second width ($w_2$) adjacent the retention space 72. The first width ($w_1$) may be greater than the diameter ($d_2$) of the pin 20 in the notch 20b, and the second width ($w_2$) may be less than the diameter ($d_2$) of the pin in the notch, and the diameter ($d_2$) of the pin in the notch 20b may correspond essentially to the diameter ($d_1$) of the retention space 72. As the pin 20 is laterally inserted into the groove 74, the pin will move into the groove and first engage the arms 70a, 70b. The pin 20 may then be pressed further inward, displacing the arms 70a, 70b away from one another until the pin passes between the arms and moves into the retention space 72, at which point, the arms may return towards their original position and retain the pin therebetween, with the pin notch 20b, disposed in, and retained within the retention space.

Alternatively, a guide pin 20 may be inserted axially into the retention space 72 between the arms 70a, 70b. A tapered end 20a of the guide pin 20 may be tapered so that, as the guide pin is moved axially into the retention space 72, the tapered end 20a forces the arms 70a, 70b apart to the point wherein the guide pin may fit therebetween. The guide pin may then be further inserted until the notch 20b is disposed between the arms 70a, 70b, wherein the arms may return towards their original position and retain the pin therebetween.

Both axial ends of the notch 20b may be defined by a radial (orthogonal) edge 75a or 75b, extending from the reduced diameter ($d_2$) of the notch to the diameter ($d_3$) of the pin 20. As such, axial movement of the pin 20 out of the retention space may be prevented. For axial or lateral removal of the pin 20, the arms 70a, 70b need to be forced apart, as discussed further below, to create an opening of a size sufficient to allow the pin to pass therethrough. If, in an embodiment, the edge 75b were instead tapered from the reduced diameter ($d_2$) of the notch 20b to the diameter ($d_3$) of the pin 20, in a direction the tapered end 20a, application of an axial pulling force to the pin may allow for the pin to be axially withdrawn from the pin retainer 52 as the taper would slide between the arms 70a, 70b and open the arms as the pin was withdrawn. However, to prevent tampering, or unauthorized removal of the pins 20, a preferred embodiment requires the use of a tool, as discussed below with reference to FIGS. 12, 13A, 13B, 14A and 14B, for example, to force open the retaining arms 70a, 70b.

Figure 8A:
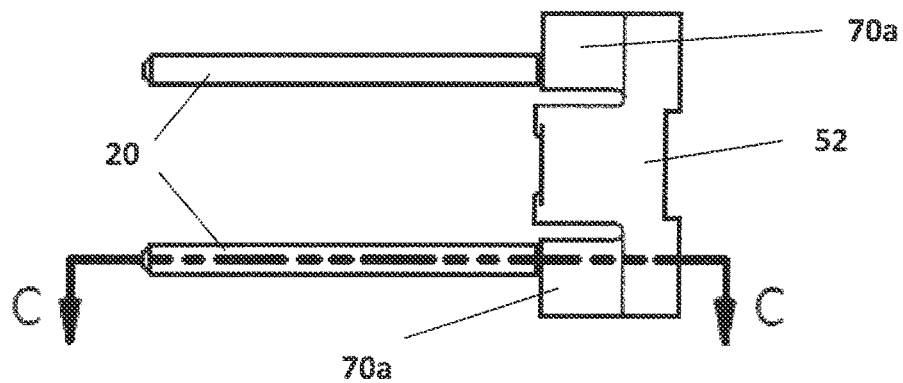
FIGS. 8A-8D provide top, side and sectional views of a pin retained with a pin retainer according to an embodiment.
Figure 8C:
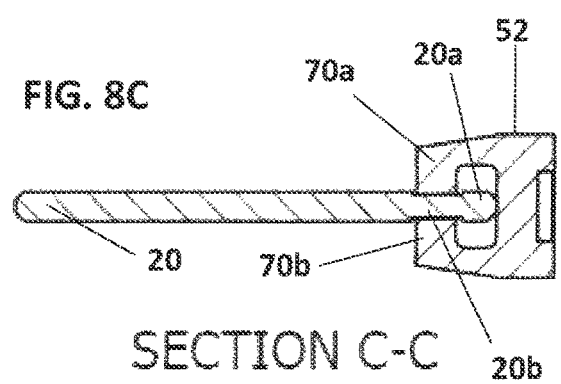
Figure 8B:
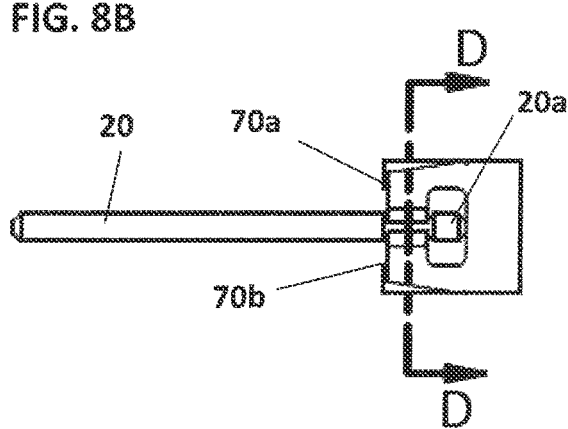
Figure 8D:
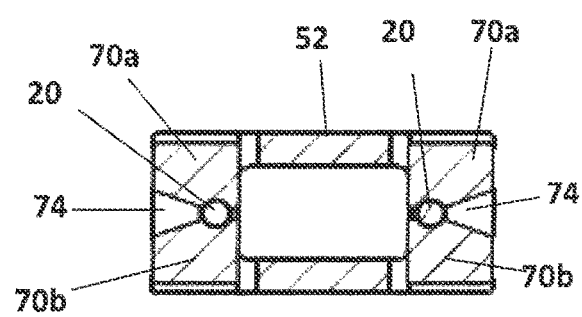

FIGS. 8A-8D provide top and side views, as well as sectional views of a pin 20 retained with a pin retainer 52. FIG. 8C depicts a longitudinal section through the pin 20 and pin retainer 52 of an embodiment as represented in FIG. 8A. As shown, the pin 20 may be axially retained within the pin retainer 52. FIG. 8D depicts a transverse section through the pin 20 and pin retainer 52 of an embodiment as represented in FIG. 8B. As shown, the pin 20 may be laterally retained within the pin retainer 52.

Figure 9:
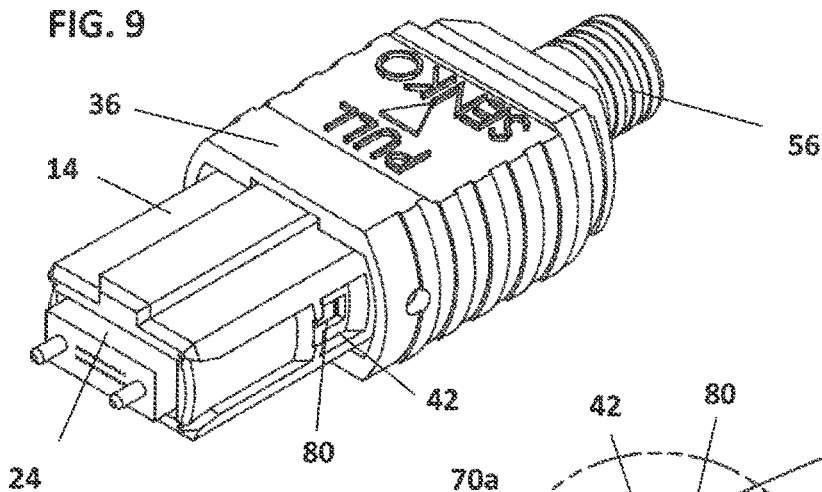
FIG. 9 depicts a perspective view of a male connector with its outer housing pulled back to show the release slots according to an embodiment.
Figure 10:
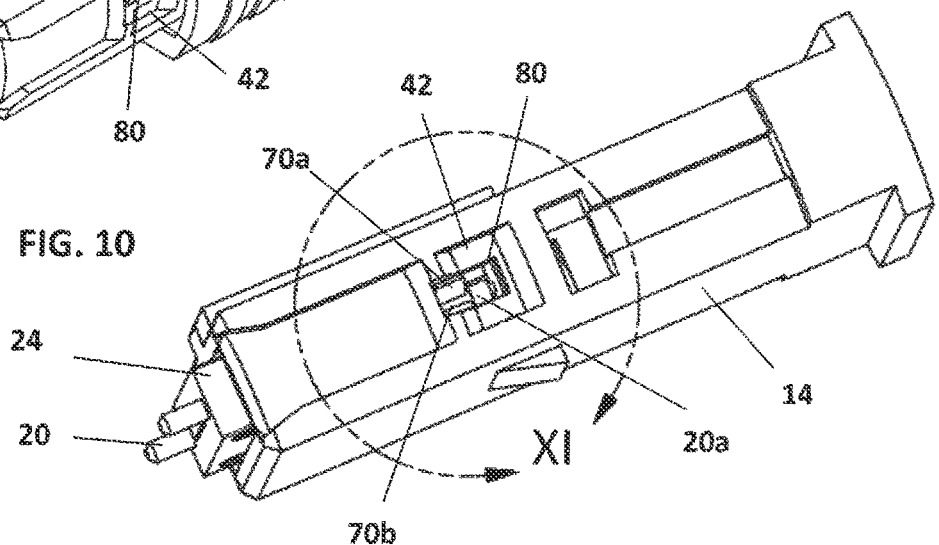
FIG. 10 provides a side view of the inner housing showing the release slots according to an embodiment.
Figure 11:
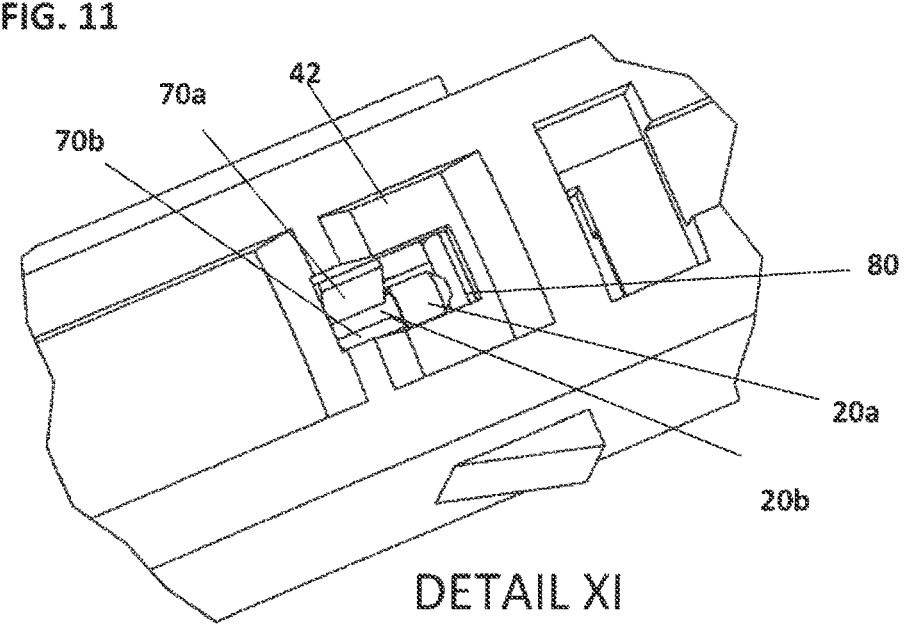
FIG. 11 is a detailed view of the release slots shown in FIG. 10 according to an embodiment.

As represented in FIG. 9, to provide a fiber optic connector that may be changed from male (with pins 20) to female (without pins 20) access to release the pins may be provided via passages 80 that may be provided in the sides of the inner housing 14. In an embodiment as shown, the passages 80 may be provided within the slots 42. As represented in FIG. 9, in comparison to the view provided by FIG. 1A, the outer housing 36 may be moved rearwardly away from the front end of the connector to expose the slots 42 and passages 80. The passages 80 (refer to FIG. 10) may be configured to provide access to the arms 70a, 70b (refer to FIG. 11) through the walls of the inner housing 14.

The passages 80 may be configured to accommodate a release tool 82 as depicted in FIGS. 12-13B. In an embodiment, the release tool 82 may be configured to include at least two nibs 84a, 84b that fit through the passages 80, one on each side of the inner housing 14, so that, when forced inwardly through the passages, push the arms 70a, 70b apart by an amount sufficient to release the pins 20 from the pin retainer 52. FIG. 13B depicts a general positioning of a release tool 82 and nibs 84a, 84b relative to a connector 10 with the outer housing 36 displaced rearwardly for removal of the pins 20.

Figure 14A:
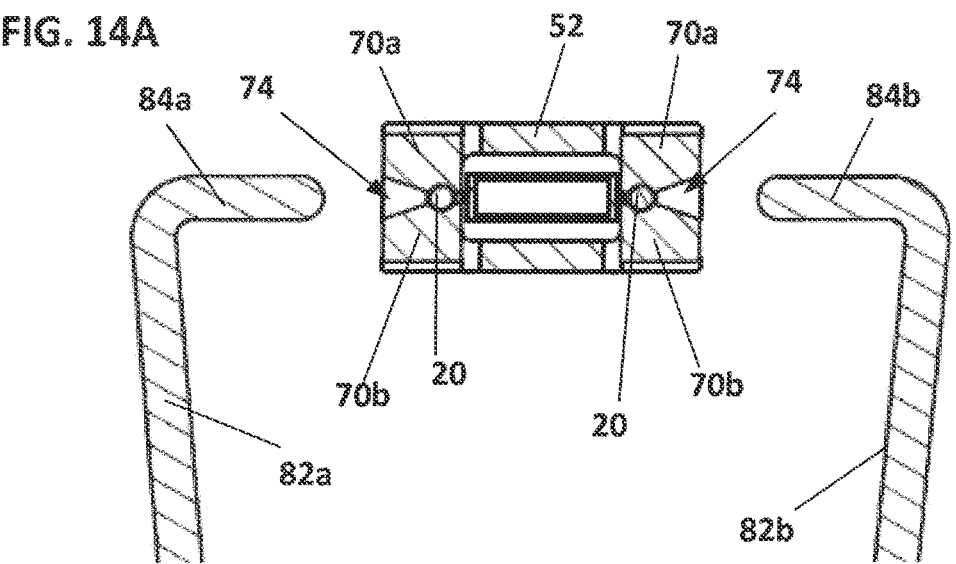
FIGS. 14A and 14B are sectional views showing use of a tool to release the pins according to an embodiment.
Figure 14B:
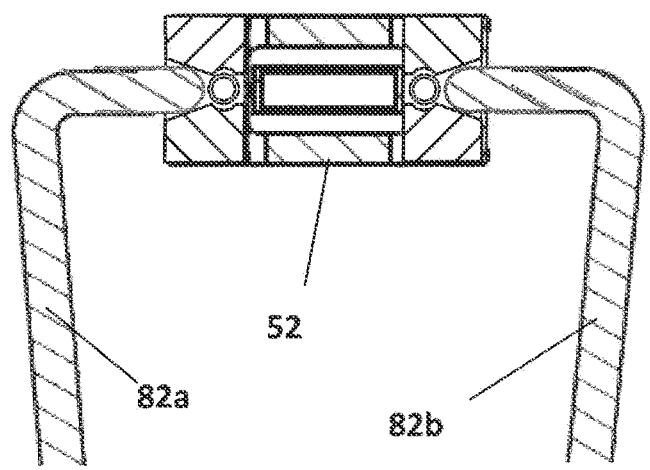

For clarity, FIGS. 14A and 14B reproduce only the pin retainer 52, pins 20, and a portion of the release tool 82 of FIG. 13B. As shown in FIGS. 14A and 14B, the tool nibs 84a, 84b may be aligned with the tapered groove 74 between the arms 70a, 70b. In an embodiment, the tool arms 82a, 82b may be squeezed towards one another to move the nibs 84a, 84b into the tapered groove 74 and between the arms 70a, 70b to displace the arms away from one another and away from the pins 20 as represented in FIG. 14B. After the arms 70a, 70b are sufficiently displaced, the pins 20 may be removed from the pin retainer 52 and from the connector 10 to change the connector from a male connector 10 (FIG. 1A) to a female connector 12 (FIG. 1B).

Referring to FIG. 6, 8B, 8C, 10 or 11, alternatively, a female connector 12 may be converted to a male connector 10 by inserting the tapered ends 20a of the pins 20 into the guide/alignment holes 22, and pushing the pins inwardly into the pin retainer 52. Because of the tapered configuration of the ends 20a of the pins 20, the tapered ends 20a may force the retainer arms 70a, 70b apart to make it possible for the pins to enter between the arms. When the pin notch 20b passes into the retention space 72 between the arms, the arms may return to their original position to lock the pins in place. If desired, to facilitate insertion of the pins 20 into the pin retainer 52 the release tool 82 could be used to open the arms 70a, 70b thereby making it possible to insert the pins with less force on the pins.

Figure 15A:
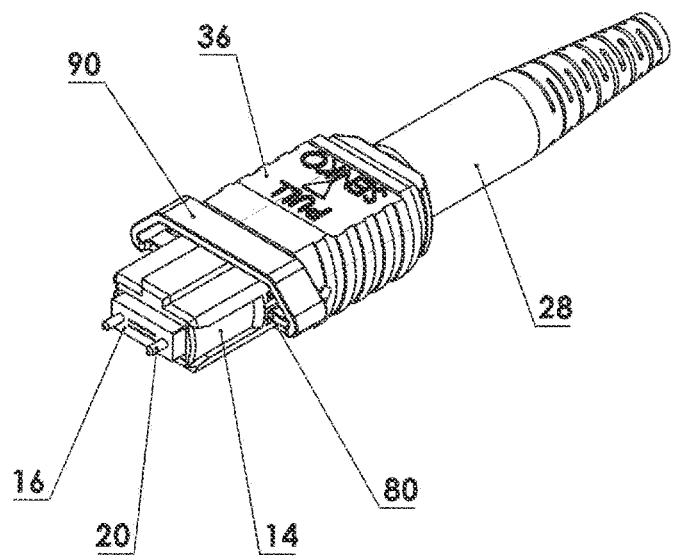
FIGS. 15A and 15B show an alternative tool configuration according to an embodiment.
Figure 15B:
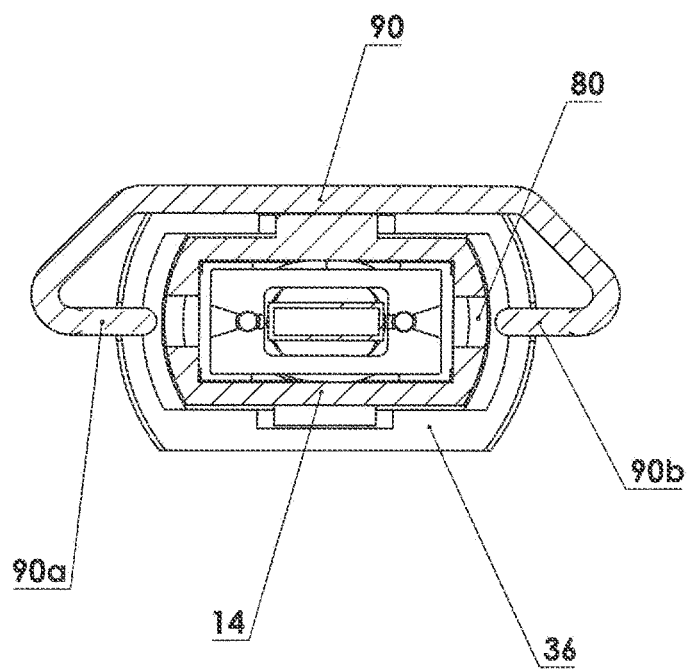

An alternative embodiment of a release tool 90 is depicted in FIGS. 15A and 15B. As shown, the release tool 90 may be more compact while maintaining nibs 90a, 90b in a configuration appropriate for entering the passages 80. While two variants of a release tool are shown, other configurations within the general skill of the artisan may also be provided. In an embodiment (not shown directly, but a variant of which is provided below) a separate tool may not be needed if the inner housing 14 was configured with release tabs that are integral with the housing and include nibs that project partially into the tapered groove 74. A user may then simply squeeze the sides of the connector at the corresponding tabs to press the nibs further in the groove 74 to displace the arms 70a, 70b.

An alternative embodiment of a pin retainer 152 and associated release tool 182 are represented in FIGS. 16A-16D. Instead of having lateral tapered grooves 74 like the embodiment of pin retainer 52, the retainer may be configured to include tapered grooves 174 that extend from a top or bottom surface of the retainer. Arms 170a may be displaceable laterally away from a central core 175. In essentially the same manner as previously discussed with reference to the earlier embodiments, the pins 20 may be retained within the retainer 152, but between displaceable arms 170a and the central core 175. For converting a female connector to a male connector, the pins 20, because of the tapered ends 20a, may be pushed into the retainer 152 so that as the tapered ends are pushed between the arms 170a and the central core 175, the arms may be forced away from the central core.

To convert from a male connector to a female connector, a release tool, such as tool 182 may be used to force the arms 170a laterally away from the central core 175 to open the retainer and provide clearance for the pins 20 to be released from the retainer. In an embodiment (not shown), the tool 182 may be a separate tool carried by the user, and the inner housing 114 may include a corresponding opening, openings 115 for accommodating the tool so that the nibs 190a, 190b may be inserted through the housing to displace the arms 170a.

Figure 16A:
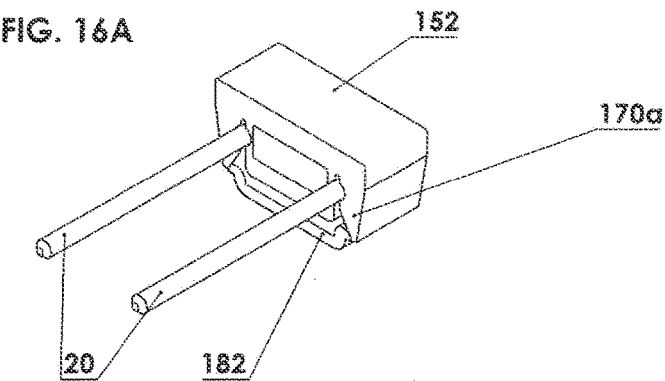
FIGS. 16A-16D show an alternative configuration of a pin retainer according to an embodiment.
Figure 16B:
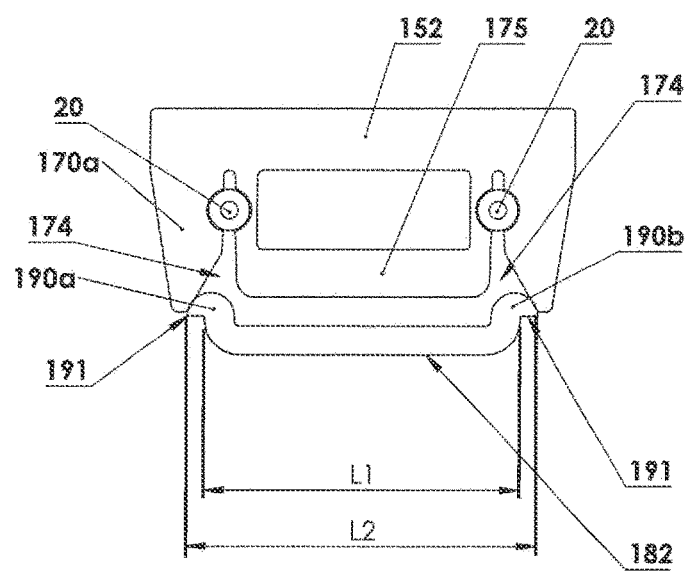
Figure 16C:
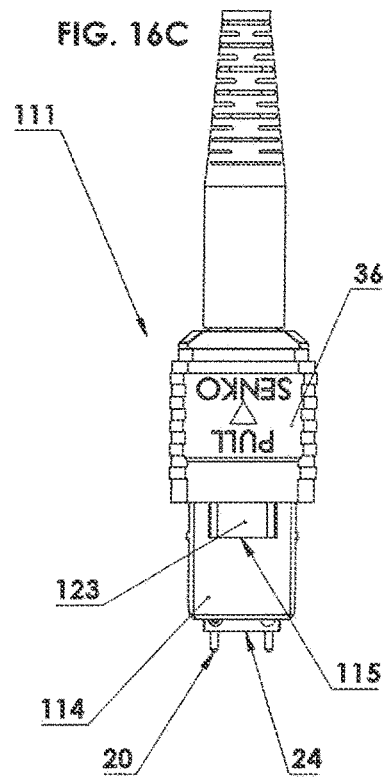
Figure 16D:
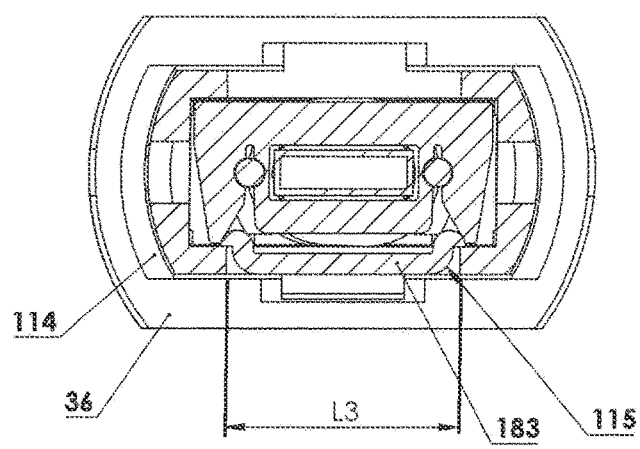

In an alternative embodiment, as shown in FIGS. 16C and 16D, the tool 182 may be separate from the housings and retainer, but included as a component of the connector 111. As represented in FIG. 16B, the tool 182 may include a body portion 183 from which the nibs 190a, 190b project. The tool 182 may include projecting hooks 191 that extend laterally away from the nibs 190a, 190b and body portion 183, such that the body portion may define a first length ($L_1$) and the hooks define a second length ($L_2$) that is greater than the first length ($L_1$). The inner housing 114 may include an opening 115 that accommodates the body portion 183. The opening 115 may have a width that is essentially the same as, or slightly greater than a width of the body portion 183, and a length ($L_3$) that is essentially the same as or slightly greater than the length ($L_1$), but less than the length ($L_2$). With such a configuration of the tool 182, the hooks 191 will not fit through the opening 115 so that the tool 182 is retained within the inner housing 114. The tool body portion 183 may have flexibility and resiliency to allow the tool 182 to be bent for insertion through the opening. For example, a first side with nibs 190a may be inserted through the opening 115, the tool can be bent to reduce the length ($L_3$) to fit through the opening, and the second end with nibs 190b may be inserted into place wherein the tool may then return to its original configuration as shown.

Application of an inward pressure on the body portion 183 may force the nibs 190a, 190b inwardly into the tapered grooves 174 to press arms 170a, 170a outwardly away from the central core 175, thereby providing clearance between the pins 20 and the arms to allow the pins to be removed in a similar manner as to that shown and discussed with reference to FIG. 14B. While not shown in the drawings, the outer housing 36, when in its forward position (shown displaced rearwardly in FIG. 16C), may completely cover, or alternatively cover a substantial portion of the tool body portion 183 and opening 115 to prevent an accidental force on the body portion from releasing the pins 20.

Figure 17A:
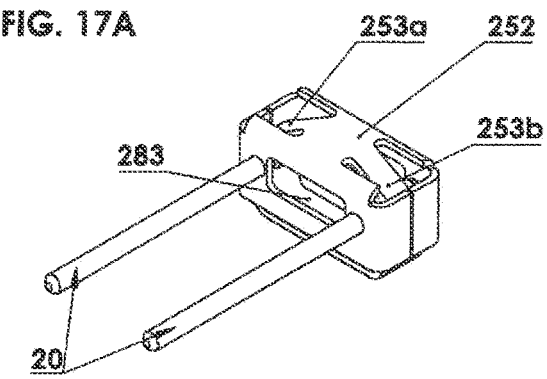
FIGS. 17A-17D show an alternative configuration of a pin retainer according to an embodiment.
Figure 17C:
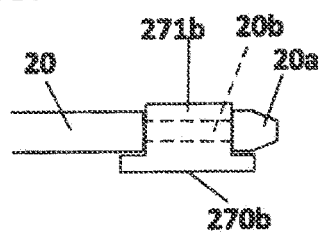
Figure 17B:
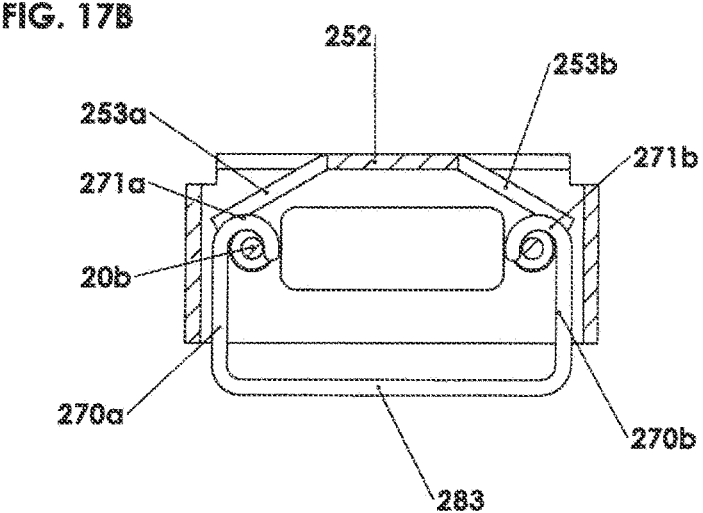

An alternative configuration of a pin retainer 252 is represented in FIGS. 17A-17D. In an embodiment, a U-shaped retention clip 283 may include J-shaped hooks 271a, 271b at the ends of arms 270a, 270b. The J-shaped hooks 271a, 271b may be configured to curl into, or fit into the pin notches 20b so that, when disposed in the notches, the pins 20 will be held within the pin retainer 252. FIG. 17C represents a top view looking down at a J-hook 271b and pin 20 from the top of the configuration of FIG. 17B. The pin retainer 252 may include resilient spring arms 253a, 253b configured to apply pressure to the J-hooks 271a, 271b to retain the J-hooks in the notches 20b. With reference to FIG. 17B, resilient spring arms 253a, 253b, may apply a downward pressure on J-hooks 271a, 271b to hold the J-hooks in the notches 20b (shown in cross-section).

Referring to FIG. 17A, to release pins 20, an upward force against the spring arms 253a, 253b may be applied to the clip 283 so that arms 270a, 270b move the J-hooks 271a, 271b upwardly and out of the notches 20b. This will free the pins 20 so that the pins may be removed from the pin retainer 252. Upon removal of the pins 20, the spring arms 270a, 270b may return to their original positon pushing the J-hooks 271a, 271b downwardly. As for previous embodiments, to insert pins 20 into the retainer 252, the tapered ends 20a may be inserted in and forced under the J-hooks 271a, 271b to move the J-hooks upwardly against the force of spring arms 253a, 253b until the notches 20b are aligned with the J-hooks, at which time the J-hooks will be forced downwardly into the notches under the force of the spring arms.

Figure 17D:
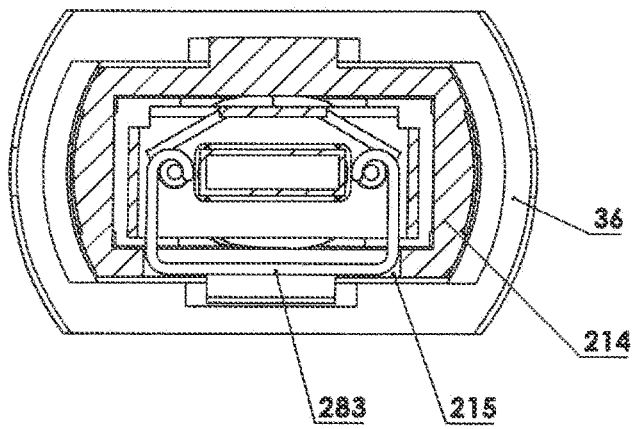

As shown in cross-section in FIG. 17D, the inner housing 214 may include an opening 215 for access (which could resemble the opening 115 as shown in FIG. 16C) to press inwardly on the clip 283. While not shown in the drawings, the outer housing 36, when in its forward position may completely cover, or alternatively cover a substantial portion of, the clip 283 and opening 215 to prevent an accidental force on the body portion from releasing the pins 20.

In an alternative embodiment, spring arms 253a, 253b could be configured to fit into the notches 20b to engage with the pins 20 and retain the pins in the retainer 252 instead of the J-hooks. A U-shaped, or alternative configuration tool (not shown), for example a U-shaped tool essentially resembling the clip 283, but without the J-hooks may be configured to release the pins 20. The tool may be separate from the connector housing, or included as a part of the connector housing, and may be configured to be pushed into the housing to engage the spring arms 253a, 253b and move the spring arms away from and out of the notches 20b to release the pins 20.

As represented in FIGS. 18A and 18B, a pin retainer 352 may be configured integral with the inner housing 324 to form a one-piece housing unit (compared with the configuration of FIG. 4). In an embodiment, the arms 370a, 370b may be configured similar to arms 70a, 70b as previously discussed, for example with reference to FIG. 6. Arms 370a, 370b may define a tapered notch 374 therebetween, and a tool, such as tool 82 (FIG. 12) may be used to open the arms for release of pins 20.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A multi-fiber fiber optic connector configured to be converted between a female connector configuration and a male connector configuration by releasing or connecting notched guide pins, each notched guide pin including a retention notch, the multi-fiber fiber optic connector comprising:
a housing having a front end portion and a rear end portion spaced apart along a longitudinal axis;
a ferrule disposed in the housing for terminating a plurality of optical fibers, the ferrule having a front end portion and a rear end portion spaced apart along a longitudinal axis, the ferrule comprising first and second guide pin passages extending longitudinally from the rear end portion through the front end portion, the first and second guide pin passages being spaced apart along a fiber alignment axis, the ferrule configured to hold a plurality of optical fibers in one or more rows parallel to the fiber alignment axis, the ferrule being configured to accept one of the notched guide pins in each of the first and second guide pin passages such that the retention notch is rearward of the rear end portion of the ferrule; and
a pin keeper disposed in the housing rearward of the rear end portion of the ferrule, the pin keeper comprising a retention clip having an operating shape, the retention clip being movable in relation to the ferrule between a retaining position and a release position without deflection of the retaining clip from its operating shape during movement of the retention clip between the retaining position and the release position, wherein when the retention clip is in the retaining position, the retention clip is configured to move into the retention notches of the notched guide pins received in the first and second guide pin passages for retaining the notched guide pins in the first and second guide pin passages, wherein when the retention clip is in the release position, the retention clip disengages from the retention notches of notched guide pins received in the first and second guide pin passages for releasing the guide pins from the first and second guide pin passages; and
wherein the multi-fiber fiber optic connector is configured so that the retention clip is resiliently biased toward the retaining position.

2. The multi-fiber fiber optic connector as set forth in claim 1, further comprising a spring configured to apply pressure to the retention clip to resiliently bias the retention clip toward the retaining position.

3. The multi-fiber fiber optic connector as set forth in claim 1, wherein the housing is an inner housing, the multi-fiber optic connector further comprising an outer housing disposed on the inner housing for movement relative to the inner housing between a forward position and a rear position.

4. The multi-fiber fiber optic connector as set forth in claim 3, wherein the inner housing comprises an access opening operatively aligned with the retention clip such that the retention clip can be moved from the retaining position to the release position.

5. The multi-fiber fiber optic connector as set forth in claim 4, wherein the outer housing is configured to cover the access opening in the forward position and expose the access opening in the rear position.

6. The multi-fiber fiber optic connector as set forth in claim 1, wherein the pin keeper further comprises a front body portion between the retention clip and the ferrule.

7. The multi-fiber fiber optic connector as set forth in claim 6, wherein the retention clip is a separate piece from the front body portion.

8. The multi-fiber fiber optic connector as set forth in claim 7, wherein the front body portion defines first and second guide pin openings through which notched guide pins extend rearward to the retention clip.

9. The multi-fiber fiber optic connector as set forth in claim 7, wherein the retention clip is displaceable in relation to the front body portion between the retaining position and the release position.

10. A multi-fiber fiber optic connector configured to be converted between a female connector configuration and a male connector configuration by releasing or connecting notched guide pins, each notched guide pin including a retention notch, the multi-fiber fiber optic connector comprising:

an housing having a front end portion and a rear end portion spaced apart along a longitudinal axis;

a ferrule disposed in the housing for terminating a plurality of optical fibers, the ferrule having a front end portion and a rear end portion spaced apart along a longitudinal axis, the ferrule comprising first and second guide pin passages extending longitudinally from the rear end portion through the front end portion, the first and second guide pin passages being spaced apart along a fiber alignment axis, the ferrule configured to hold a plurality of optical fibers in one or more rows parallel to the fiber alignment axis, the ferrule being configured to accept one of the notched guide pins in each of the first and second guide pin passages such that the retention notch is rearward of the rear end portion of the ferrule;

a pin keeper disposed in the housing rearward of the rear end portion of the ferrule, the pin keeper comprising a retention clip defining a first opening and a second opening larger than the first opening, the retention clip further defining a throat, the first and second openings communicating with each other through the throat, the pin keeper being adjustable for moving the retention clip between a retaining position and a release position by moving the entire retention clip relative to the ferrule such that the notched guide pin passes through the throat from the first opening to the second opening in a direction transverse to the alignment axis as the retention clip moves from the retaining position to the release position;

wherein when the retention clip is in the retaining position, the retention clip is configured to move into the retention notches of the notched guide pins received in the first and second guide pin passages for retaining the notched guide pins in the first and second guide pin passages; and wherein when the retention clip is in the release position, the retention clip disengages from the retention notches of notched guide pins received in the first and second guide pin passages for releasing the guide pins from the first and second guide pin passages.

11. The multi-fiber fiber optic connector as set forth in claim 10, wherein the retention clip has a first arm having a curved end portion configured for selectively engaging the retention notch of a notched guide pin received in the first guide pin passage and a second arm having a curved end portion configured for selectively engaging the retention notch of a notched guide pin received in the second guide pin passage.

12. The multi-fiber optic connector as set forth in claim 11, wherein the clip is shaped and arranged such that the curved end portions of the first and second arms move conjointly in relation to the ferrule as the clip is moved.

13. The multi-fiber fiber optic connector of claim 12, wherein the curved end portions of the first and second arms define concave edges configured to face toward the notched guide pins, the concave edge of the first arm facing toward the fiber alignment axis.

14. The multi-fiber optic connector as set forth in claim 11, wherein the curved end portion of the first arm defines a curved hook.

15. The multi-fiber fiber optic connector as set forth in claim 10, wherein the multi-fiber fiber optic connector is configured so that the retention clip is resiliently biased toward the retaining position.

16. A multi-fiber fiber optic connector configured to be converted between a female connector configuration and a male connector configuration by releasing or connecting notched guide pins, each notched guide pin including a retention notch, the multi-fiber fiber optic connector comprising:

a housing having a front end portion and a rear end portion spaced apart along a longitudinal axis;

a ferrule disposed in the housing for terminating a plurality of optical fibers, the ferrule having a front end portion and a rear end portion spaced apart along a longitudinal axis, the ferrule comprising first and second guide pin passages extending longitudinally from the rear end portion through the front end portion, the first and second guide pin passages being spaced apart along a fiber alignment axis, the ferrule configured to hold a plurality of optical fibers in one or more rows parallel to the fiber alignment axis, the ferrule being configured to accept one of the notched guide pins in each of the first and second guide pin passages such that the retention notch is rearward of the rear end portion of the ferrule;

a pin keeper disposed in the housing rearward of the rear end portion of the ferrule, the pin keeper comprising a front body portion, a rear body portion, and a retention clip being disposed between front body portion and the rear body portion, the front body portion configured to pass the notched guide pins received in the first and second guide pin passages to the retention clip, the rear body portion defining a space for receiving rear end portions of notched guide pins retained by the retention clip, the retention clip being formed from a separate piece of material than the front body portion and the rear body portion, the retention clip being movable in relation to the ferrule between a retaining position and a release position;

wherein when the retention clip is in the retaining position, the retention clip is configured to move into the retention notches of the notched guide pins received in the first and second guide pin passages for retaining the notched guide pins in the first and second guide pin passages; and wherein when the retention clip is in the release position, the retention clip disengages from the retention notches of notched guide pins received in the first and second guide pin passages for releasing the guide pins from the first and second guide pin passages.

17. The multi-fiber optic connector as set forth in claim 16, wherein the multi-fiber optic connector is configured to resiliently bias the retention clip toward the retaining position.

18. The multi-fiber fiber optic connector as set forth in claim 17, wherein the retention clip is configured to move between the retaining position and the release position substantially without deforming.

19. A multi-fiber fiber optic connector configured to be converted between a female connector configuration and a male connector configuration by releasing or connecting notched guide pins, each notched guide pin including a retention notch, the multi-fiber fiber optic connector comprising:

an housing having a front end portion and a rear end portion spaced apart along a longitudinal axis;

a ferrule disposed in the housing for terminating a plurality of optical fibers, the ferrule having a front end portion and a rear end portion spaced apart along a longitudinal axis, the ferrule comprising first and second guide pin passages extending longitudinally from the rear end portion through the front end portion, the first and second guide pin passages being spaced apart along a fiber alignment axis, the ferrule configured to hold a plurality of optical fibers in one or more rows parallel to the fiber alignment axis, the ferrule being configured to accept one of the notched guide pins in each of the first and second guide pin passages;

a retention clip disposed in the housing, the retention clip defining a first opening and a second opening larger than the first opening, the retention clip further defining a throat, the first and second openings communicating with each other through the throat, the retention clip being movable with respect to the ferrule between a retaining position and a release position by moving the entire retention clip relative to the ferrule such that the notched guide pin passes in a direction transverse to the alignment axis through the throat from the first opening to the second opening as the retention clip moves from the retaining position to the release position;

wherein when the retention clip is in the retaining position, the retention clip is configured to move into the retention notches of the notched guide pins received in the first and second guide pin passages for retaining the notched guide pins in the first and second guide pin passages; and wherein when the retention clip is in the release position, the retention clip disengages from the retention notches of notched guide pins received in the first and second guide pin passages for releasing the guide pins from the first and second guide pin passages.

20. The multi-fiber fiber optic connector as set forth in claim 19 wherein the retention clip has an external perimeter and axial projections of the first and second guide pin passages remain within the external perimeter of the in the retaining position and in the release position.

21. The multi-fiber fiber optic connector as set forth in claim 20, wherein the retention clip is configured to move between the retaining position and the release position substantially without deforming.

22. The multi-fiber fiber optic connector as set forth in claim 20, wherein the retention clip comprises a single piece of material configured to simultaneously engage into the retention notches of the two notched guide pins received in the first and second guide pin passages in the retaining position.

23. The multi-fiber fiber optic connector as set forth in claim 22, the retention clip defining a pair of first openings spaced apart along the lateral axis, a pair of second openings larger than the first openings spaced apart along the lateral axis, and a pair of throats spaced apart along the lateral axis, wherein each first opening communicates with a respective second opening through a respective throat, wherein the retention clip is sized and arranged so that:

when the retention clip is in the retaining position, the first and second guide pin passages are aligned vertically and laterally with the pair of first openings such that the notched guide pins received in the first and second guide pin passages are seated in the pair of first openings;

when the retention clip is in the release position, the first and second guide pin passages are aligned vertically and laterally with the pair of second openings; and as the retention clip moves from the retaining position to the release position, the notched guide pins received in the first and second guide pin passages pass from the pair of first openings to the pair of second openings through the pair of throats.

24. A multi-fiber fiber optic connector configured to be converted between a female connector configuration and a male connector configuration by releasing or connecting notched guide pins, each notched guide pin including a retention notch, the multi-fiber fiber optic connector comprising:

an inner housing having a front end portion and a rear end portion spaced apart along a longitudinal axis, the inner housing having opposite first and second side walls spaced apart along a lateral axis perpendicular to the longitudinal axis, and a top wall and a bottom wall spaced apart along a vertical axis perpendicular to the lateral axis, the inner housing having an access opening for facilitating gender change;

a ferrule disposed in the inner housing for terminating a plurality of optical fibers, the ferrule having a front end portion and a rear end portion spaced apart along a longitudinal axis, the ferrule comprising first and second guide pin passages extending longitudinally from the rear end portion through the front end portion, the first and second guide pin passages being spaced apart along a fiber alignment axis parallel to the lateral axis, the ferrule configured to hold a plurality of optical fibers in one or more rows parallel to the fiber alignment axis, the ferrule being configured to accept one of the notched guide pins in each of the first and second guide pin passages such that the retention notch is rearward of the rear end portion of the ferrule;

a retention clip disposed in the inner housing rearward of the rear end portion of the ferrule, the retention clip adjustable via the access opening for moving the retention clip between a retaining position and a release position by displacing the entire retention clip relative to the ferrule in a plane transverse to the longitudinal axis;

wherein when the retention clip is in the retaining position, the retention clip is configured to engage into the retention notches of the notched guide pins received in the first and second guide pin passages for retaining the notched guide pins in the first and second guide pin passages; and wherein when the retention clip is in the release position, the retention clip disengages from the retention notches of notched guide pins received in the first and second guide pin passages for releasing the guide pins from the first and second guide pin passages.

25. The multi-fiber fiber optic connector as set forth in claim 24, wherein the retention clip has a first curved surface configured for selectively engaging the retention notch of a notched guide pin received in the first guide pin passage and a second curved surface configured for selectively engaging the retention notch of a notched guide pin received in the second guide pin passage.

26. The multi-fiber optic connector as set forth in claim 25, wherein the first and second curved surfaces move conjointly in relation to the ferrule as the retention clip is displaced in the plane transverse to the longitudinal axis.

27. The multi-fiber fiber optic connector of claim 25, wherein the first curved surface and the second curved surface face in a vertical direction.

* * * * *